United States Patent [19]

Maruta et al.

[11] Patent Number: 4,870,526

[45] Date of Patent: Sep. 26, 1989

[54] AUTOMATIC POWER TURN-OFF APPARATUS FOR AN ELECTRONIC APPARATUS

[75] Inventors: Syuzi Maruta, Toyokawa; Masazumi Ito, Toyohashi, both of Japan

[73] Assignee: Minolta Camera Kabushiki Kaisha, Osaka, Japan

[21] Appl. No.: 95,059

[22] Filed: Sep. 9, 1987

[30] Foreign Application Priority Data

Sep. 9, 1986 [JP] Japan ................................ 61-213317

[51] Int. Cl.⁴ ................................................ H02H 3/00

[52] U.S. Cl. ........................................ 361/1; 307/140; 307/141; 307/141.4; 355/206

[58] Field of Search .................... 361/1; 307/140, 141, 307/141.4; 355/14 R, 15

[56] References Cited

U.S. PATENT DOCUMENTS 4,090,787 5/1978 Hubbard et al. .................. 355/14 R
4,245,296 1/1981 Small et al. .................. 307/141.4 X
4,436,408 3/1984 Inuzuka et al. .................... 355/14 R
4,480,195 10/1984 Sawaki et al. ............... 307/141.4 X

*Primary Examiner*—Derek S. Jennings
*Attorney, Agent, or Firm*—Price, Gess & Ubell

[57] ABSTRACT

In an automatic power turn-off apparatus, a signal for turning off power supply is outputted from a timer IC when time set by a power-off time setting key arrives, whereby the power supply of an associated copying apparatus is turned off. In the turn-off period, if an MPU determines that the copying apparatus is in trouble, the turn-off of the power supply is cancelled and the occurrence of the trouble in the copying apparatus is displayed in a display device to notify the user of the trouble.

7 Claims, 15 Drawing Sheets

AUTOMATIC POWER TURN-OFF APPARATUS FOR AN ELECTRONIC APPARATUS

DESCRIPTION OF THE PRIOR ART

Field of the Invention

The present invention relates to an automatic power turn-off apparatus for an electronic apparatus. More particularly, the present invention relates to an improvement of an automatic power turn-off apparatus for use in an office machine such as a copying apparatus or a facsimile, or other electronic apparatus, in which power supply of the electronic apparatus is turned off when a preset time arrives or after a preset period has passed.

Description of the Prior Art

In the prior art, various electronic apparatus are provided with an automatic power turn-off function of turning off the power supply of the apparatus concerned on the arrival of a preset time or after the lapse of a preset period, thereby to avoid wasteful consumption of electric power and to prevent degradation in performance of the apparatus. For example, a power supply of an apparatus used in an office such as an electrophotographic copying apparatus is automatically turned off after a preset time if the user presets the time by taking account of the frequency of use of the apparatus. To use the apparatus after the automatic turn-off, the power supply is turned on again by using a power-on switch or the like.

On the other hand, such an apparatus has often a trouble display function by which the occurrence of a trouble, a content of the trouble or measures to be taken and the like are indicated, or an alarm by an electronic sound is issued when the trouble occurs due to a failure or other abnormality. For example in the case of the above mentioned copying apparatus, if a trouble occurs e.g. defective operation of a motor or an optical system, breakage of a heater for fixation, failure of an eraser lamp or an exposure lamp, jam of paper, insufficiency of sheets of paper in a cassette or insufficiency of toner occurs, a lamp for indicating the occurrence of the trouble or a serviceman call display is illuminated and a code for indicating the content of the trouble is displayed on a display device. Consequently, if a trouble occurs not only in a state in which the copying apparatus is used but also in a state in which it is not used, the occurrence of the trouble can be easily found by the above mentioned trouble display function and appropriate means can be taken to remedy the trouble.

However in the conventional copying apparatus, the above described automatic power turn-off function is executed even if it is in trouble, and as a result, the trouble display disappears. Accordingly, if trouble occurs when the copying apparatus is not used, the occurrence of the trouble cannot be found because of the turn-off of the power supply and it is only when the copying apparatus is turned on next time that the occurrence of the trouble can be found. In addition, if a trouble occurs when the copying apparatus is used, the user might forget the occurrence of the trouble because of disappearance of the trouble at the next turn-on time of the apparatus display. As a result, measures for recovery from the trouble are taken belatedly, causing a considerable delay in copy work or a considerable decrease in real operation time of the copying apparatus.

SUMMARY OF THE INVENTION

Therefore, a primary object of the present invention is to provide an automatic power turn-off apparatus for an electronic apparatus, in which if a trouble occurs in the electronic apparatus, prompt measures can be taken for recovery from the trouble and the above described disadvantages in the conventional apparatus that the user forgets the trouble or the trouble is found belatedly can be overcome.

Briefly stated, the present invention is adapted to stop power supply from a power supply means to an electronic apparatus on the arrival of a preset time and to cancel the stop of the power supply to the electronic apparatus upon detection of a trouble in the electronic apparatus.

Consequently, according to a first aspect of the present invention, if the related electronic apparatus is in trouble, the power supply to the electronic apparatus is not turned off even on the arrival of or after the lapse of preset time, which makes it possible to prevent a failure to notify the occurrence of the trouble. Thus, the disadvantages that the user forgets the occurrence of the trouble or the occurrence of the trouble is found after a delay can be overcome and it becomes possible to make a prompt recovery from the trouble, thereby to avoid a considerable decrease in real operation time of the electronic apparatus.

According to a second aspect of the invention, an automatic power turn-off apparatus for use in an apparatus for forming an image on paper is provided. This automatic power turn-off apparatus supplies electric power to image forming means for forming an image on paper and stops the power supply to the image forming means when timer means measures a predetermined time and provides an output signal. When a trouble state of the image forming means is detected, the automatic power turn-off apparatus notifies the trouble and cancels the stop of the power supply to the image forming means.

Therefore, according to the first aspect of the present invention, if a copying apparatus, a laser printer, a facsimile or the like is in trouble, the power supply is not turned off even if a predetermined time arrives or has elapsed and, accordingly, the occurrence of the trouble can be notified continuously. Thus, the user will never forget the occurrence of the trouble or it will be found without delay.

According to the second aspect of the invention, if a trouble occurs in a copy means for copying an original set in an exposure position, any stoppage of the power supply to the copy means is cancelled.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 4 to 16 are flow charts showing processing procedures executed by a first microprocessing unit (MPU) shown in FIG. 3. Particularly, FIG. 4 shows a main routine;

FIG. 5 shows an initialization routine;

FIG. 6 shows a temperature adjustment routine;

FIG. 7 shows an operation processing routine;

FIG. 8 shows a time setting routine;

FIG. 10 shows an automatic power-off routine;

FIG. 11 shows a trouble resetting routine;

FIG. 12 shows a trouble display routine;

FIG. 13 shows a switch input routine;

FIG. 14 shows a power saving control routine;

FIG. 15 shows a temperature adjustment control routine; and

FIG. 16 shows a display control routine.

DESCRIPTION OF THE PREFERRED EMBODIMENTS

An embodiment of the present invention, utilized in an electrophotographic copying apparatus will be described in the following, with reference to the drawings.

Figure 1:
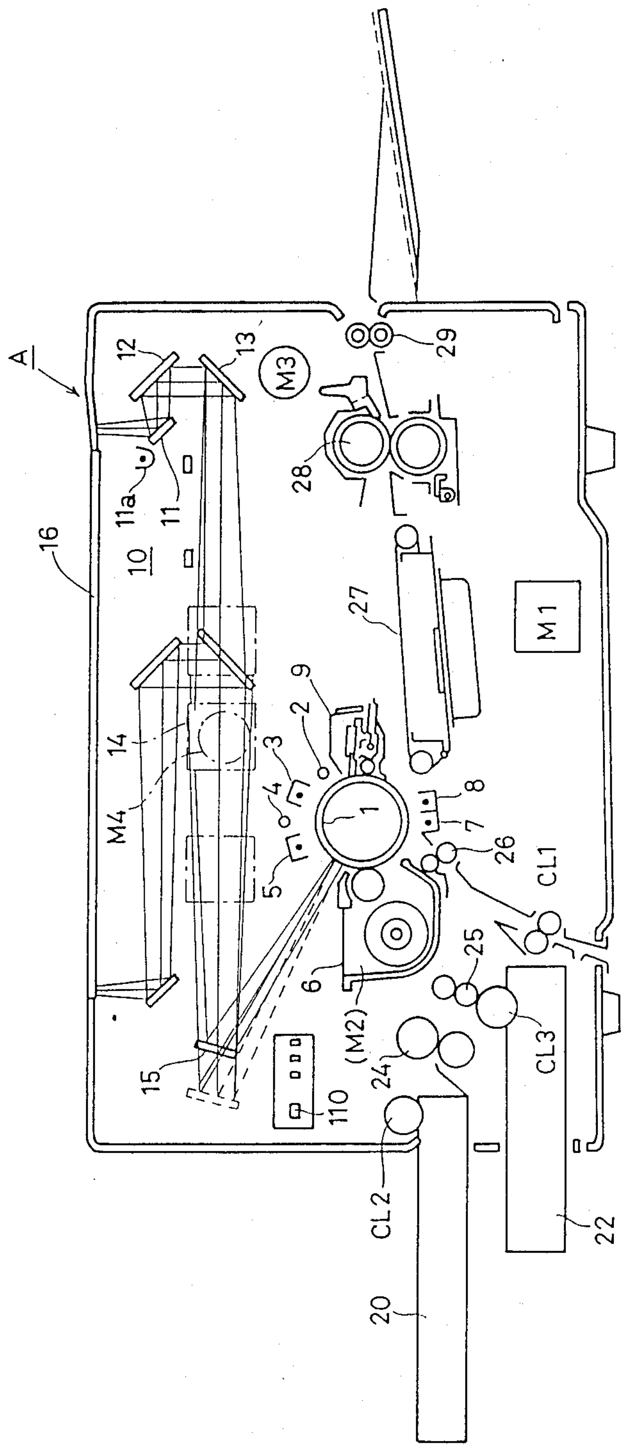
FIG. 1 is a front sectional view showing an example of an overall construction of a copying apparatus to which an automatic power turn-off apparatus of the present invention is applied.

FIG. 1 is a front sectional view showing a construction of the copying apparatus A. A photoconductor drum 1 driven counterclockwise is provided nearly in a central portion of the main body of the copying apparatus A. A main eraser lamp 2, an auxiliary electrification charger 3, an auxiliary eraser lamp 4, a main electrification charger 5, a developing device 6, a transfer charger 7, a paper separation charger 8 and a cleaning device 9 of a blade type are provided around the photoconductor drum 1. The photoconductor drum 1 has a surface on which a photoconductor layer is provided. The photoconductor layer is sensitized increasingly when the drum 1 passes along the eraser lamps 2 and 4, and the chargers 3 and 5, whereby the photoconductor layer is subjected to exposure from an optical system 10.

The optical system 10 is located under a document table 16 of glass to scan an image of a document. The optical system 10 comprises a light source 11*a*, movable mirrors 11, 12 and 13, a lens 14 and a mirror 15. The light source 11*a* and the movable mirror 11 are driven by a scan motor M3 to move leftward at a speed v/n (n being a copying magnification) with respect to a rotating speed v of the photoconductor drum 1 (constant irrespective of an equal magnification or a variable magnification), and the movable mirrors 12 and 13 are driven by the scan motor M3 to move leftward at a speed v/2n. In order to change the magnification, the lens 14 is caused to move on an optical axis and the mirror 15 is caused to move and sway. However, a device for changing magnification is well known and a detailed description thereof is omitted.

On the other hand, an upper paper feed portion 20 and a lower paper feed portion 22 are provided on the left side of the main body of the copying apparatus A, and a transport path for copy paper is formed by rollers 24 and 25, timing rollers 26, a transport belt 27, a fixing device 28 and discharge rollers 29. A trouble reset key 110 is provided in a position permitting the user to operate it when a front door is opened.

Figure 2:
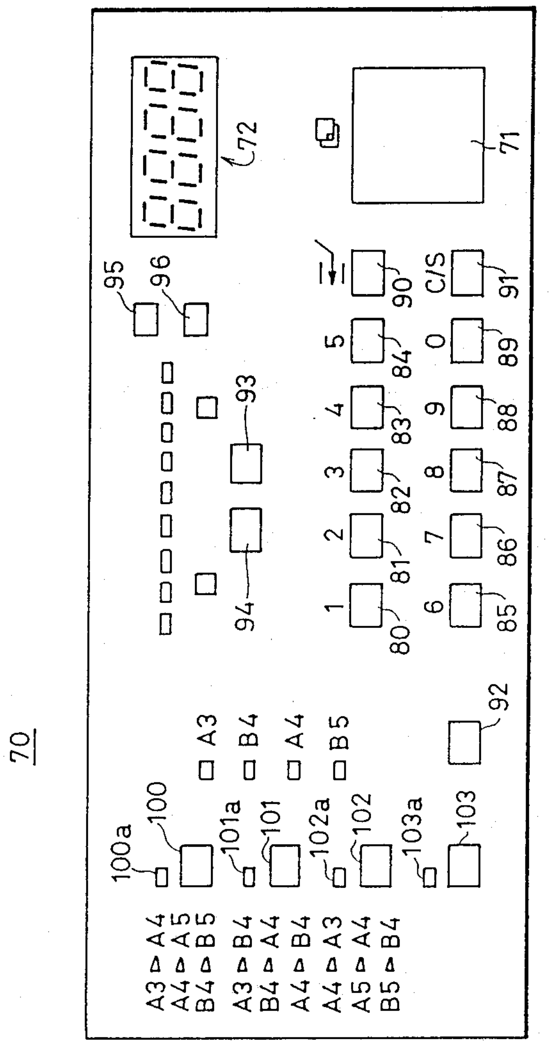
FIG. 2 is a plan view showing a configuration of an operation panel of the copying apparatus shown in FIG. 1.

FIG. 2 shows an arrangement of various operation keys in an operation panel portion of the copying apparatus A. An operational panel 70 comprises: a print key 71 for starting a copy operation; a numerical display device 72 formed of 7-segment LEDs and capable of displaying a numerical value of four digits; ten keys 80 to 89 corresponding to numerals 1 to 9 and 0, respectively; an interruption key 90 for designating interruption copy; a clear stop key 91; a paper selection key 92 for designating any of the paper sizes of sheets of copy paper in paper feed cassettes attached to the main body of the copying apparatus A; an up-key 93 and a down-key 94 for changing and designating a density of copied image by steps; and magnification setting keys 100 to 103. Magnification values corresponding to the magnification setting keys 100 to 103 are stored in advance in a memory device to be described afterwards and a copy operation is performed with a magnification value set by any of the keys 100 to 103.

A power-off time setting key 95 serves to set a time zone for turning off the power supply of the copying apparatus A. To set a time zone for a turn-off of power supply, the power-off time setting key 95 is pressed and then data on time is inputted through the ten keys 80 to 89. Then, the power-off time setting key 95 is pressed again, whereby the data on time is stored. An off-state of power supply in the set time zone is cancelled by a cancel key 96.

Figure 3:
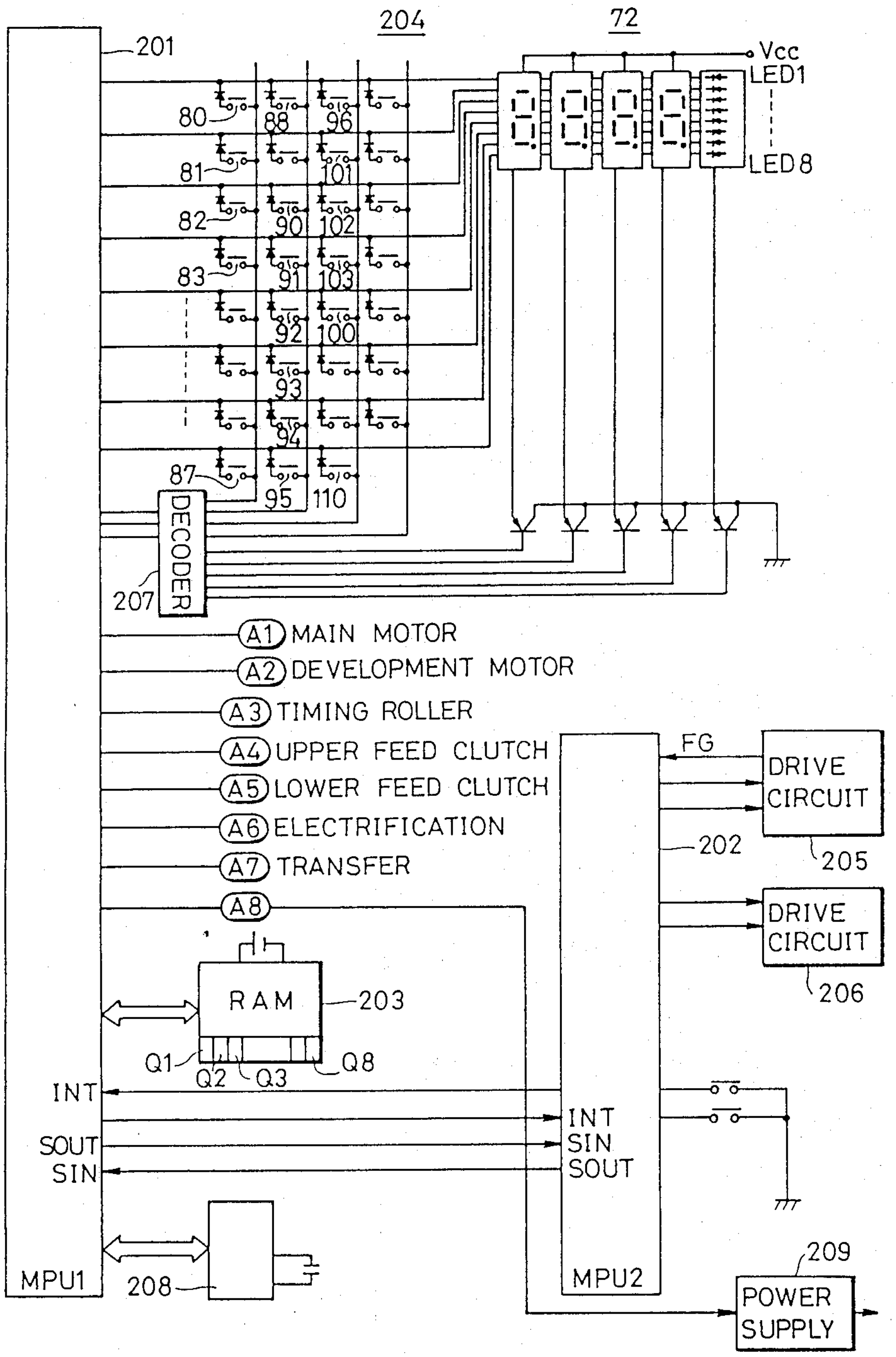
FIG. 3 is a block diagram showing a construction of a control circuit of the copying apparatus shown in FIG. 1.

FIG. 3 shows a control circuit of the copying apparatus A. The control circuit comprises: a first MPU (microprocessing unit) 201, a second MPU 202, an RAM 203 backed up by battery, a switch matrix 204 formed by keys on the operation panel, a drive circuit 205 of the DC motor M3 for scanning of a document, a drive circuit 206 of a stepping motor M4 for changing magnification, and a decoder 207. Output terminals A1 to A7 are connected to transistors (not shown) for drive switches of a main motor M1, a development motor M2, a timing roller clutch CL1, an upper feed clutch CL2, a lower feed clutch CL3, a charger 5 and a transfer charger 7. An output terminal A8 is connected to a power supply circuit 209 of the copying apparatus A. The output terminal A8 outputs a signal for turning off the power supply 209 of the copying apparatus A under specified conditions as shown in a flow chart described afterwards, when the time zone set by the power-off time setting key 95 arrives.

Various data for control of copy operation are written in the RAM 203 or shifted from a ROM in the MPU and stored in the RAM 203. The RAM 203 has storage regions Q1 to Q4 corresponding to the selection keys 100 to 103. For example, when the selection key 100 is turned on, data in the storage region Q1 is read out, and when the selection key 101 turned on, data in the storage region Q2 is read out. In addition, the RAM 203 stores time data on the set time zone for turn-off of power supply.

The reference numeral 208 denotes a chronometric IC, which is backed up by battery. Once it is set, it indicates the time thereafter. This chronometric IC 208 is connected with the first MPU 201 through a data bus and the first MPU 201 receives time data from the chronometric IC 208.

FIGS. 4 to 16 show procedures executed by the first MPU 201.

Figure 4:
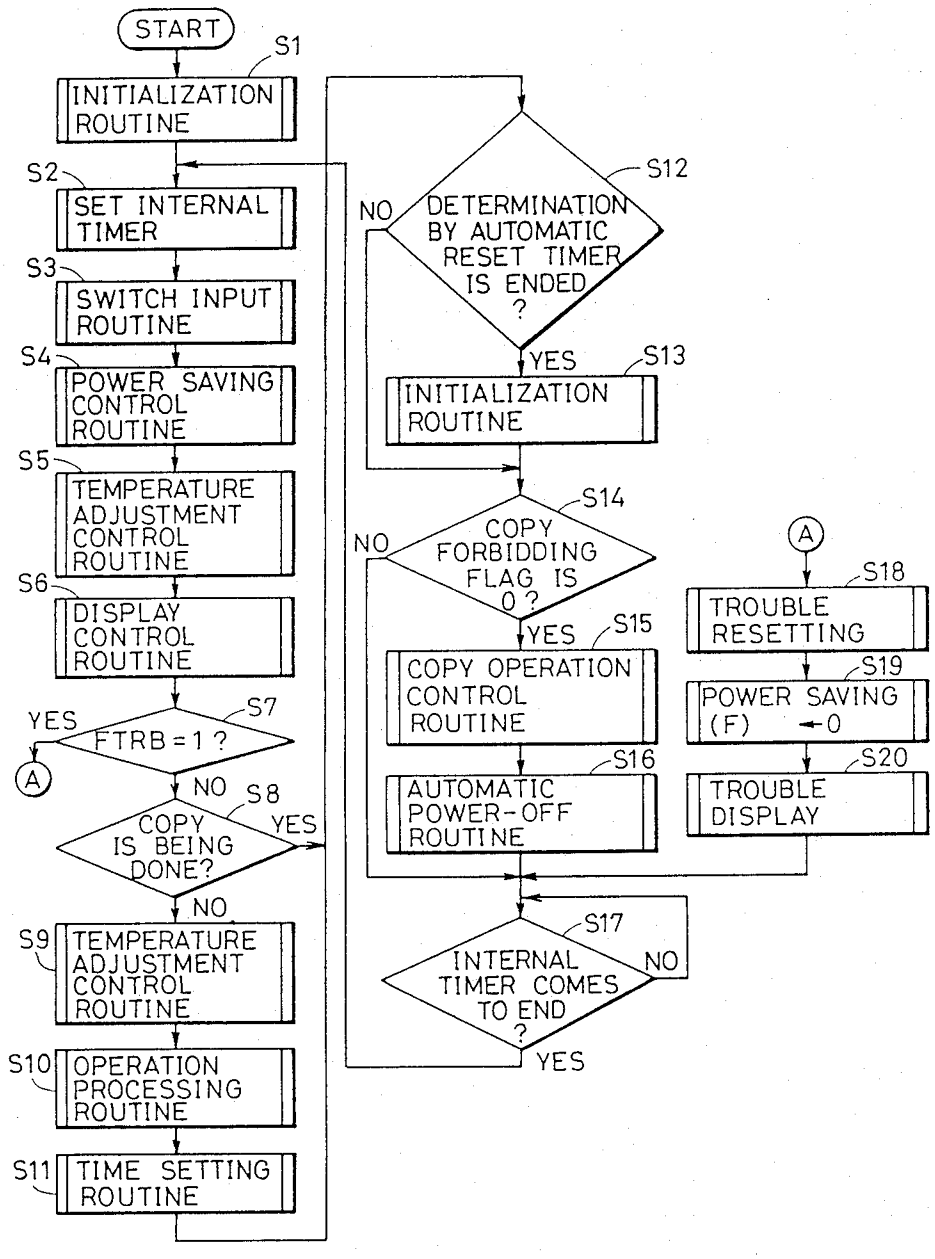
Figure 5:
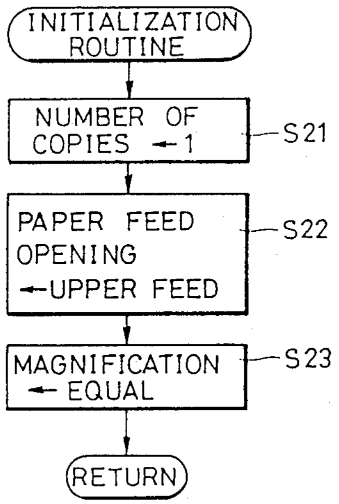

FIG. 4 schematically shows an outline of the processing in the first MPU 201. When the program starts, a subroutine for initializing the MPU 201 and the copying apparatus A is executed in the step S1. In this subroutine for initialization, the number of copies is set to 1, a paper feed opening is set to the upper feed cassette and the magnification is set to the equal scale, as shown in FIG. 5. In the step S2, an internal timer of the first MPU 201 is set and then in the step S3, data are inputted through the various switches in the copying apparatus A. Subsequently, subroutines for controlling power saving, temperature adjustment and display are executed in he steps S4, S5 and S6, respectively.

In the step S7, a state of a trouble flag FTRB is checked to determine whether the apparatus A is in trouble or not. If it is in trouble, a subroutine for trouble resetting is executed in the step S18 to determine whether a trouble resetting key is pressed or not, and power saving operation is cancelled in the step S19. More specifically, if power saving operation is set in the step S4, the power saving operation is always cancelled in the step S19 if the apparatus A is in trouble. Accordingly, the power saving operation is not performed when the apparatus A is in trouble, and if trouble occurs during a power saving operation, the power saving operation is cancelled. After that, a subroutine for trouble display is executed in the step S20 to notify the user of the trouble.

Figure 11:
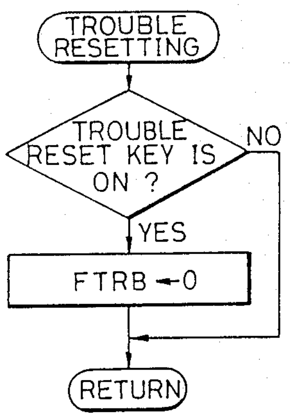
Figure 12:
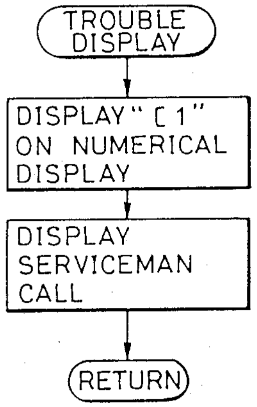

The switch input subroutine, the power saving control subroutine, the temperature adjustment control subroutine and the display control subroutine are shown in detail in FIGS. 13 to 16, and the trouble resetting subroutine and the trouble display subroutine are shown in detail in FIGS. 11 and 12. Those subroutines will be described in detail afterwards.

On the other hand, if it is determined in the step S7 that the apparatus A is not in trouble, it is determined in the step S8 whether copy operation is being performed or not. If copy operation is not being performed, a temperature adjustment subroutine, an operation processing subroutine and a time setting subroutine are executed in the steps S9, S10 and S11, respectively. Details of the temperature adjustment subroutine, the operation processing subroutine and the time setting subroutine are shown in FIGS. 6, 7 and 8, respectively.

In the step S12, a state of an automatic reset timer is determined. The automatic reset timer measures a prescribed period of time in which no operation is effected in the operation portion of the copying apparatus A. When counting of the automatic reset timer comes to an end, an initialization subroutine is executed in the step S13. Subsequently, a state of a copy forbidding flag is determined in the step S14. If the copy forbidding flag is 0, a copy operation control subroutine is executed in the step S15 and an automatic power-off subroutine is executed in the S16. Details of the copy operation control subroutine and the automatic power-off subroutine are shown in FIGS. 9 and 10. Then, when the internal timer comes to an end in the step S17, one cycle of a main routine is completed.

Figure 6:
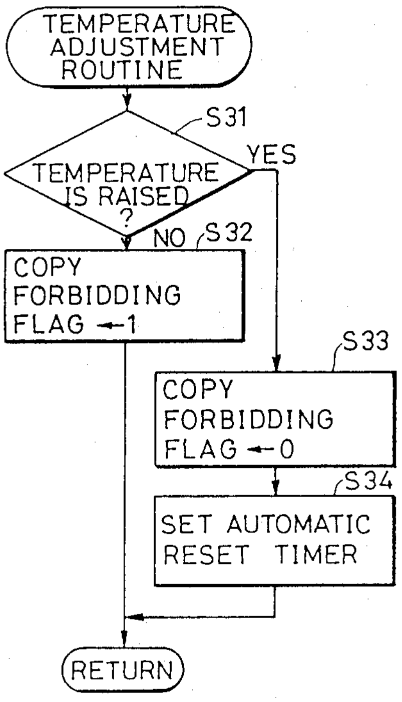

FIG. 6 shows the temperature adjustment subroutine. It is determined in the step S31 whether a temperature of the fixing device 28 (shown in FIG. 1) is raised to a set temperature. If it is not raised to the set temperature, the copy forbidding flag is set to 1 in the step S32. If it is raised to the set temperature, the copy forbidding flag is set to 0 in the step S33 and the automatic reset timer is set in the step S34.

Figure 7:
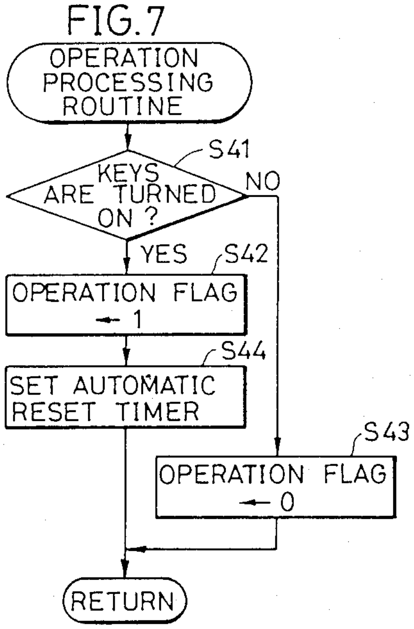
Figure 8:
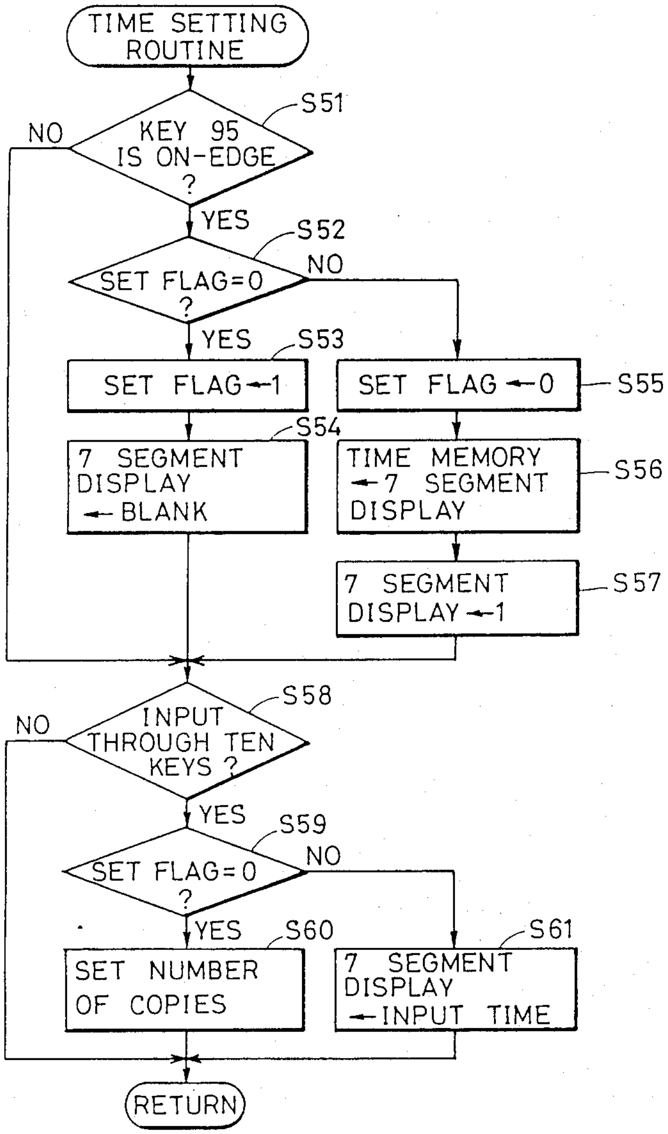

FIG. 7 shows the operation processing subroutine. It is determined in the step S41 whether keys on the operation panel 70 are turned on or not. If keys are turned on, the operation flag is set to 1 in the step S42 and the automatic reset timer is set in the step S44. If any key is not turned on, the operation flag is set to 0 in the step S43.

FIG. 8 shows the time setting subroutine. In the step S51, an on-edge of the power-off time setting key 95, i.e. a rise of a signal applied when the key 95 is pressed (shown in FIG. 2) is determined. If the key 95 is pressed and the on-edge thereof is detected, a state of the power-off time setting flag is determined in the step S52. If the power-off time setting flag is 0, which means that the time is to be set hereafter, the power-off time setting flag is set to 1 in the step S53 and the display of the 7-segment LEDs on the numerical display device 72 is caused to be blank in the step S54. If it is determined in the step S52 that the power-off time setting flag is 1, which means that the time has been already set, the power-off time setting flag is set to 0 in the step S55 and time data displayed on the numerical display device 72 is stored in the RAM 203 (shown in FIG. 3) in the step S56. Then, the numerical display device 72 is caused to display again the number of copies as "1" in the step S57. Subsequently, it is determined in the step S58 whether input is applied through the ten keys 80 to 89 (shown in FIG. 2). If input is applied through the ten keys 80 to 89, a state of the power-off time setting flag is determined in the step S59. If the power-off time setting flag is not 0, time data for turn-off of power supply inputted through the keys in the step S61 is displayed on the numerical display device 72. If the power-off time setting flag is 0, data on the number of copies inputted through the keys in the step S60 is set.

Figure 9A:
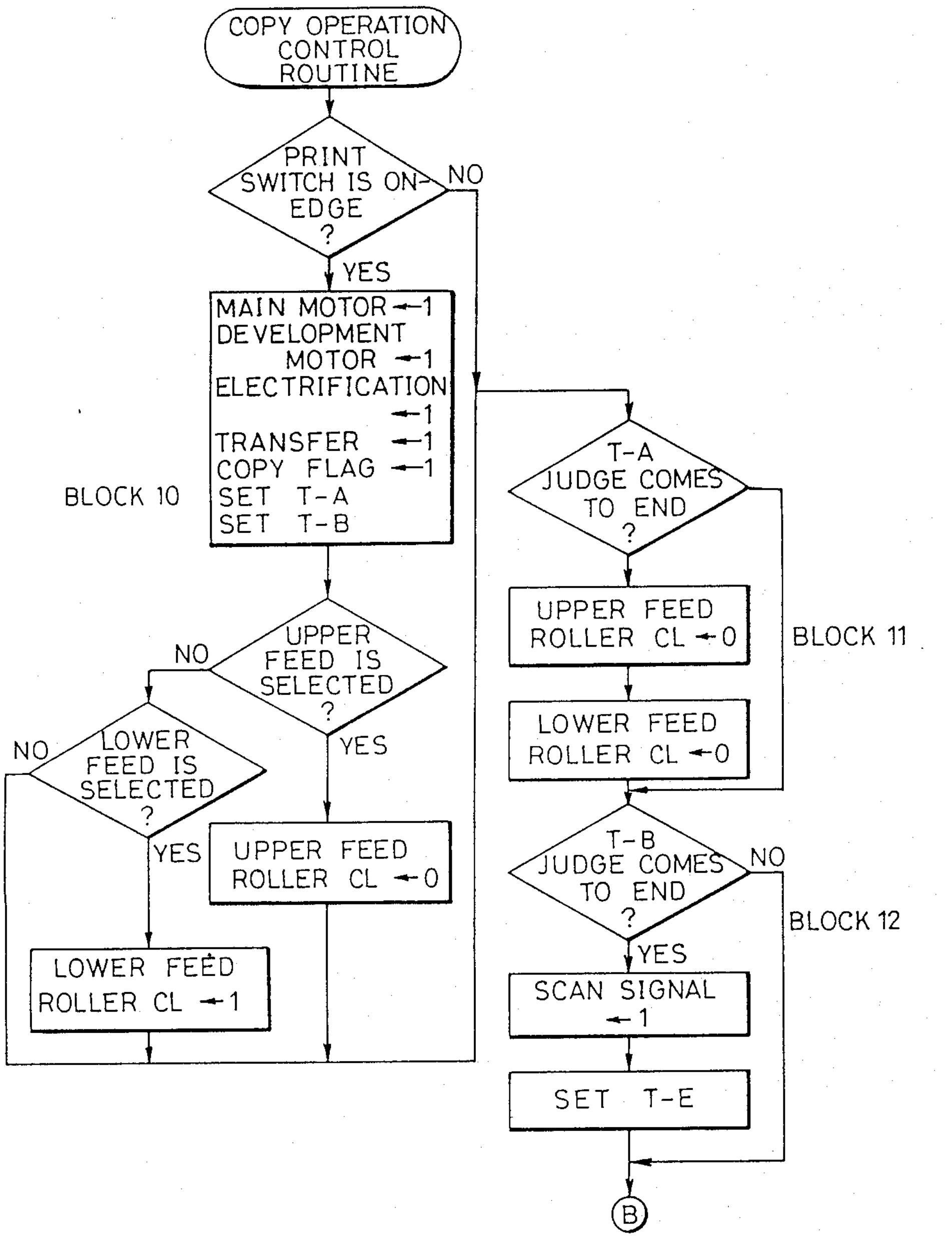
FIGS. 9A and 9B show copy operation control routines.
Figure 9B:
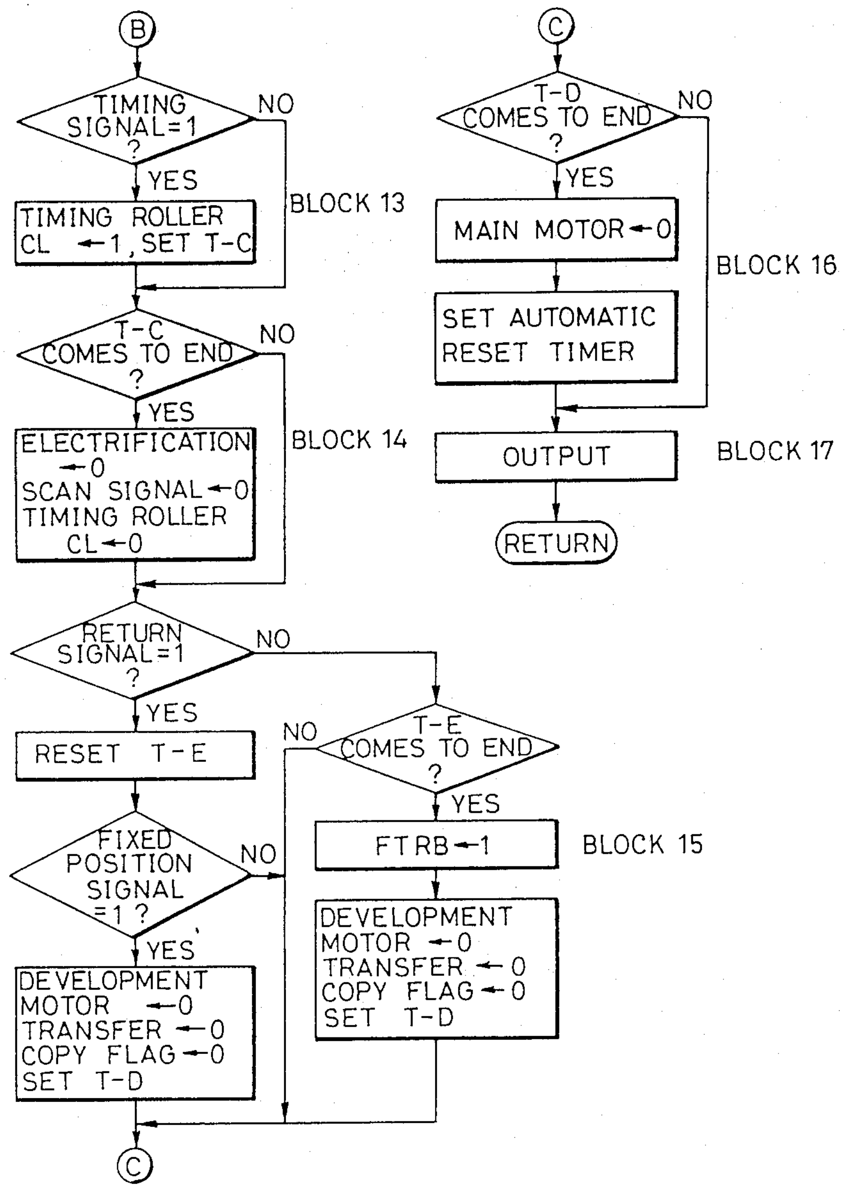
Figure 10:
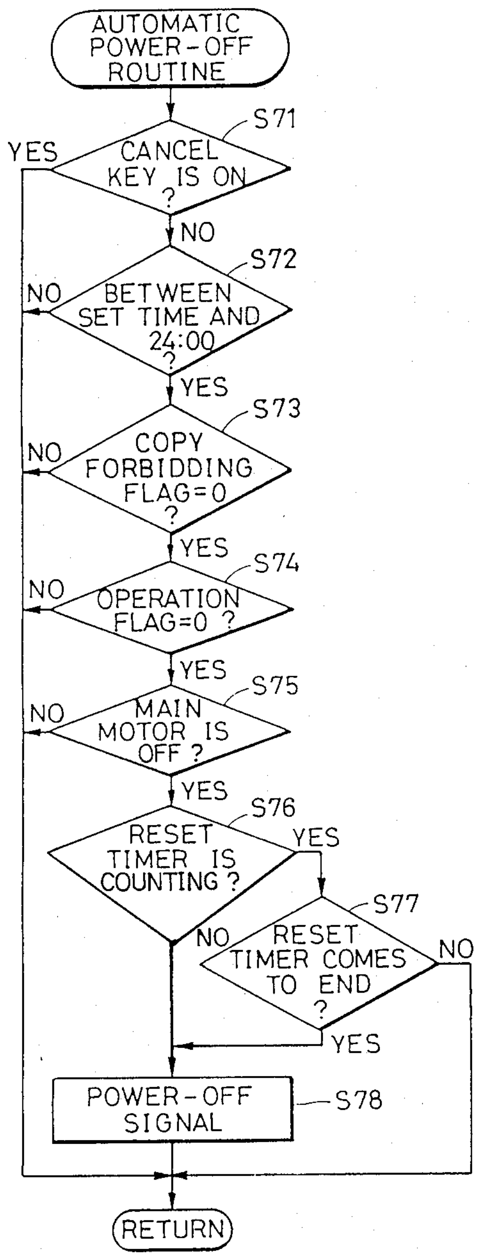
Figure 17:
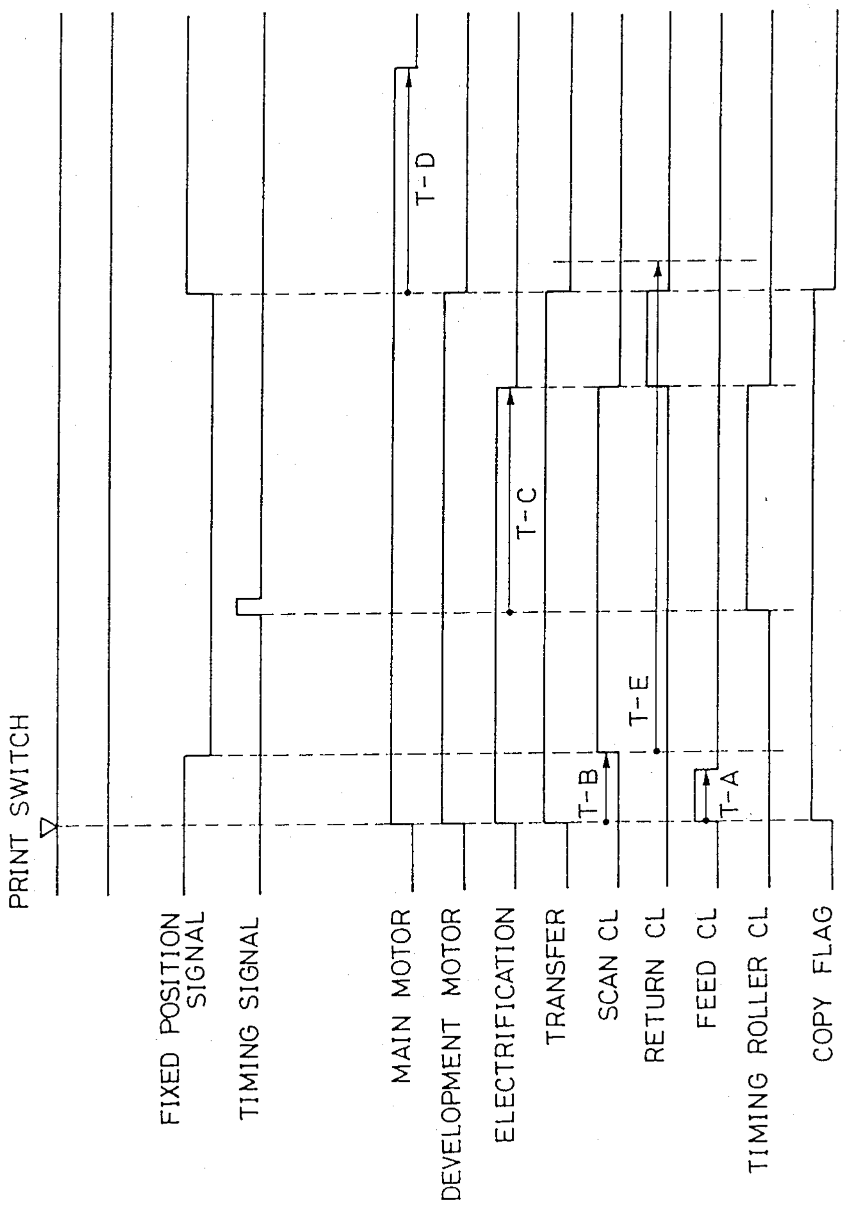
FIG. 17 is a timing chart showing operation states of main components of the copying apparatus.

FIGS. 9A and 9B are flow charts showing the copy operation control subroutine for controlling copy operation of the copying apparatus A and FIG. 17 is a timing chart showing operation of the main components of the copying apparatus A.

In the block 10, the print key 71 is turned on to operate the main motor M1 for driving the photoconductor drum 1, the development motor M2 for driving the developing device 6, the electrification chargers 3 and 5, and the transfer charger 7. At the same time, a copy flag indicating copy operation is set to 1 and timers T-A and T-B for control are started. Further, a feed roller clutch of a selected feed portion, i.e. either the upper feed portion or the lower feed portion is turned on.

In the block 11, an end of the timer T-A is determined and the clutch is turned off.

In the block 12, an end of the timer T-B is determined and the scan motor M3 for driving the scanning optical system 10 is turned on to start a scanning operation. Further, a timer T-E for detecting trouble in the scanning operation is set.

In the block 13, when a scanning operation timing switch (not shown) is operated and a timing signal is outputted, the clutch CL1 of the timing rollers 26 is turned on and a timer T-C is set. A sheet of copy paper is transported by the timing roller 26 in synchronism with an image on the photoconductor drum 1.

In the block 14, an end of the timer T-C is determined and the electrification chargers 3 and 5, the scan motor M3 and the timing roller clutch CL1 are turned off. The timer T-C may be set in a variable manner according to the size of selected copy paper or the like.

In the block 15, when the optical system is returned to a prescribed position by return operation and a position switch (not shown) is turned on, the development motor and the transfer charger are turned off and the copy flag is set to 0. At the same time, a timer T-D is set. When scanning operation is completed, the timer T-E is reset. However, if the scanning operation is not completed before the end of the timer T-E, a trouble flag FTRB is set and the development motor and the transfer charger are turned off. At the same time, the copy flag is set to 0 and the timer T-D is set.

In the block 16, an end of the timer T-D is determined and the main motor M1 is turned off.

In the block 17, processing for various outputs is executed.

The timers T-A to T-E described above in connection with the flow charts and the timing chart are digital timers programmed to count upward by 1 for one routine of processing to be executed within a period of time defined by the internal timer and the time of end of counting is stored as numeric data.

FIG. 10 shows the automatic power-off subroutine. It is determined in the step S71 whether the cancel key 96 (shown in FIG. 2) is turned on or not. If the cancel key 96 is turned off, it is determined in the step S72 whether the present time corresponds to the set time zone for turn-off of power supply. If the present time corresponds to the set time zone for turn-off of power supply, a power-off signal is outputted in the step S78 after determinations in the steps S73 to S77. More specifically, the power-off signal is outputted in the step S78 if it is determined in the steps S73 to S76 that the copy forbidding flag is 0, i.e. the temperature of the fixing device 28 has been raised to the set value, that the operation flag is 0, i.e. the keys of the operation panel 70 are not operated, that the main motor M1 is turned off, i.e. copy operation is not being effected, and that the automatic reset timer does not count. If it is determined in the step S76 that the automatic reset timer counts although the conditions in the steps S73 to S75 are satisfied, the MPU waits for an end of counting of the automatic reset timer in the step S77 and then the power-off signal is outputted in the step S78.

More specifically, in this subroutine, if temperature raising operation for the fixing device 28, key operation on the operation panel 70 of the copying apparatus A or copy operation is being effected at the time of arrival of the set time for turn-off of power supply, the power supply is not immediately turned off and the MPU waits for an end of counting of the automatic reset timer after completion of such operation. Then, the power supply is automatically turned off. If temperature raising operation for the fixing device 28, key operation on the operation panel 70 or copy operation is not being effected at the time of arrival of the set time for turn-off of power supply, the power supply is immediately turned off. In addition, if the power supply is turned on manually during the set time zone for turn-off to start copy operation and when the copy operation is completed, the power supply is automatically turned off after the end of counting of the automatic reset timer. If the cancel key 96 is pressed in the set time zone for turn-off, the off-state is cancelled.

Although the time of end of the set time zone for turn-off of power supply is 24:00 in the flow chart of FIG. 10, this time may be changed arbitrarily.

FIG. 11 shows the trouble resetting subroutine for determining input through the trouble reset key 110. When an on-edge of the trouble reset key 110 is inputted, the trouble flag FTRB is reset to 0 and the trouble state is cancelled.

Figure 20:
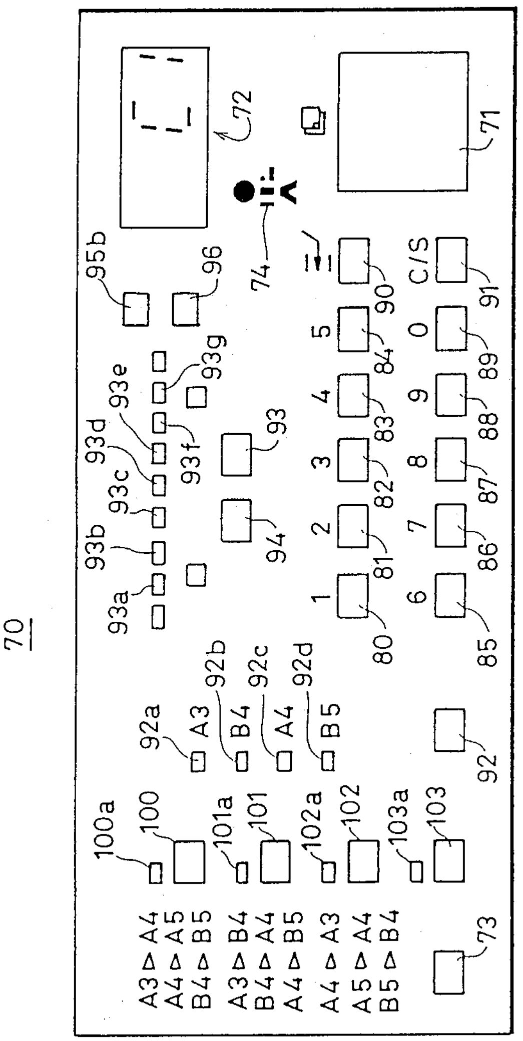
FIG. 20 is a plan view showing an example of the operation panel in which a trouble display is given.

FIG. 12 shows an example of the trouble display subroutine. In this subroutine, when defective scanning occurs, "C1" is displayed as a trouble code on the numerical display device 72 to indicate that the apparatus A is in trouble. Although only a case of display of defective scanning is shown in FIG. 12, the trouble display also applies to other cases such as failure of the eraser lamp, failure of the main motor, defective movement of the lens or defective fixation. The trouble display is usually given if such trouble occurs. In such case, a display 74 for serviceman call is simultaneously illuminated as shown in FIG. 20 to prompt the user to call a serviceman.

In the following, details of the subroutines shown in the steps S3 to S6 in FIG. 4 will be described with reference to FIGS. 13 to 16.

Figure 13:
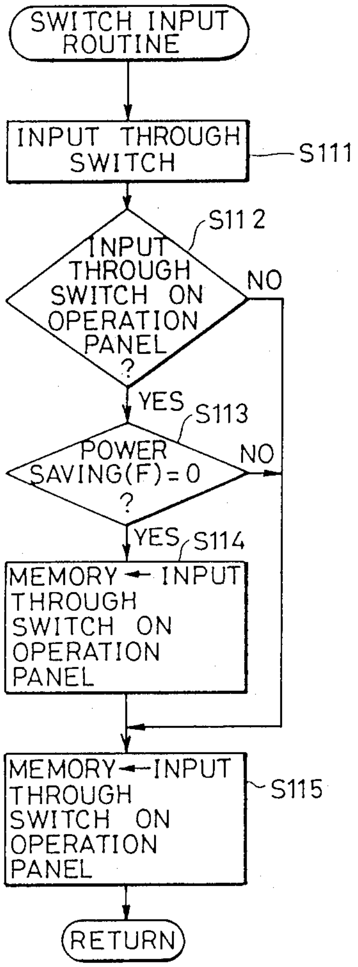

FIG. 13 shows the switch input subroutine. In this subroutine, at first, it is determined whether any of the switches are operated or not (in the step S111). Then, it is determined whether input through the keys on the operation panel 70 is applied or not (in the step S112) and if the input is applied, a state of the power saving flag is determined (in the step S113). If power saving is not being effected and the power saving flag is 0, information inputted through the switches on the operation panel 70 is stored in memory (in the step S114). If power saving is being effected and the power saving flag is 1, the input through the switches on the operation panel 70 is not stored in memory. Data inputted through the switches other than those on the operation panel 70, e.g. data inputted through a switch for detection of passing of copy paper on the transport path of the copying apparatus A or data for temperature adjustment of the fixing device are stored in memory (in the step S115). Assuming that the ten key "5" for example is operated to apply input in this switch input subroutine, this input data is stored and "5" is displayed on the 7-segment display device 72 if power saving is not being effected. However, if a signal is inputted by operation of the ten key "5" or the like during power saving, this input data is determined to be applied for the purpose of cancelling the power saving mode, not for the purpose of setting "5", and processing is performed so as not to display "5" on the 7-segment display device 72. In other words, processing designated by operation of the key is not performed and the power saving mode is cancelled. Sucn cancellation of the power saving mode can be also effected by means of other operation keys and thus it is not necessary to specially provide a cancel key, which makes it possible to simplify the mechanism of the apparatus A and makes it easier for the user to operate the apparatus A. The displayed content of the 7-segment display device 72 becomes automatically the initialized display.

Figure 14:
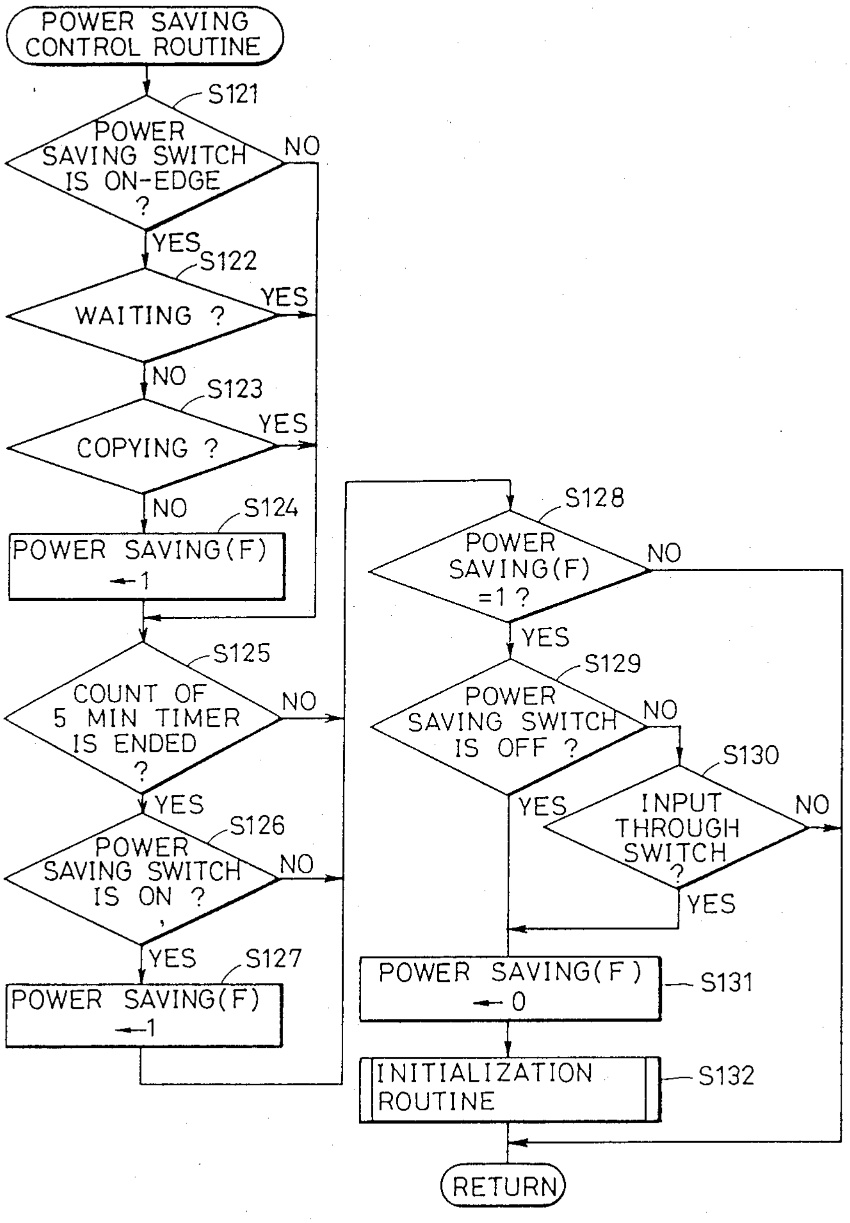

FIG. 14 shows the power saving control subroutine. At an on-edge of a power saving switch 73 (shown in FIG. 2), i.e. at the rise of a signal when the power saving switch 73 is turned on (in the step S121), and if the temperature of the fixing device is not being raised, i.e. the fixing device is not in a waiting state (in the step S122) or copy operation is not being effected (in the step S123), the power saving flag is set to 1 (in the step S124). If the power saving switch 73 is in the on-state (in the step S126) when counting of a 5-minute timer comes to an end (in the step S125), the power saving flag is set to 1 (in the step S127). The 5-minute timer starts to count at the end of a waiting period, at the end of copy operation (the end of final scanning) or at the input of any keys. Thus, processing in the power saving mode is performed. In the cases of c, d, f and g in FIG. 19,the power saving flag is set to 1 in the step S124 when the power saving switch 73 is turned on, and subsequently the procedures in the steps S125, S126 and S127 are executed. In the cases of a, b and c in FIG. 19, the procedures in the steps S125, S126 and S127 are executed when the power saving switch 73 is turned on.

Subsequently, if the power saving flag is 1 (in the step S128), and if the power saving switch is turned off (in the step S129) or input is applied through keys on the operation panel 72 (in the step S130), the power saving flag is reset to 0 (in the step S131) and the initialization subroutine described beforehand is executed (in the step S132). Thus, the initial state is re-established.

Figure 15:
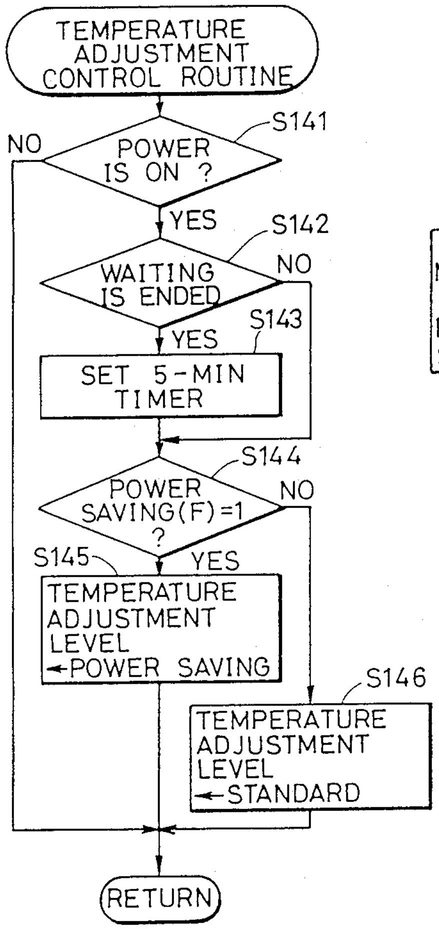
Figure 18:
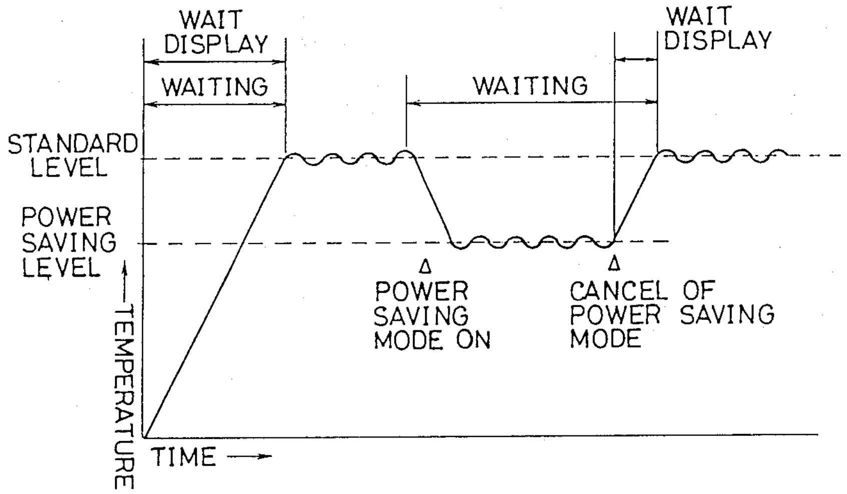
FIG. 18 is a diagram for explaining controlled states by temperature adjustment control.

FIG. 15 shows the temperature adjustment control subroutine for adjusting the temperature of the fixing device 28. In the temperature adjustment control subroutine, if the power supply is turned on (in the step S141) and if temperature raising of the fixing device 28 is completed, i.e. the waiting state is brought to an end (in the step S142), the 5-minute timer is set (in the step S143). If the 5-minute timer comes to an end and the power saving flag becomes 1 (in the step S144), the temperature is adjusted to a power saving level (in the step S145). If the power saving flag is 0, the temperature is adjusted to a standard level (in the step S146). In the temperature adjustment control, a display of "wait" is given in a period from the turn-on of the power supply until the temperature of the fixing device 28 attains the standard level, and the display of "wait" is also given in a period from the cancellation of the power saving mode for temperature adjustment at a level lower than the standard level until when the temperature is raised to the standard level, as shown in FIG. 18.

Figure 16:
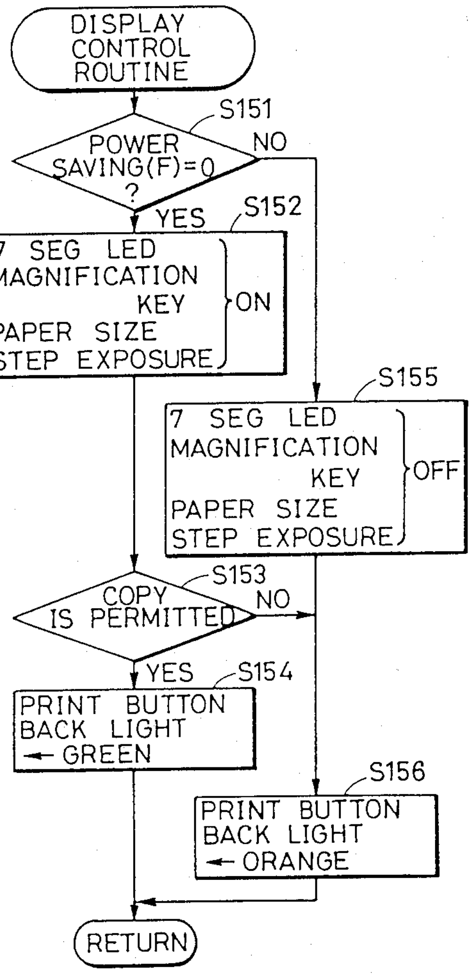

FIG. 16 shows the display control subroutine. When the power saving flag is 0 (in the step S151), the 7-segment display device 72, the paper size display elements **92*a* to 92*d*, image density display elements 93*a* to 93*g* and the magnification display elements 100*a* to 103*a* on the operation panel 70 display prescribed contents (in the step S152). If copy operation is permitted at that time (in the step S153), a green lamp provided behind the print key 71 of an illumination type is turned on. If copy operation is not permitted because of a waiting state for temperature adjustment, emptiness of copy paper, selection of the power saving mode and the like, an orange lamp provided behind the print key 71 is turned on (in the step S156). If the power saving flag is 1, all the displays on the operation panel are turned off (in the step S155) and the orange lamp of the print key 71** is turned on so as to enable the user to distinguish the power-off state from the power saving state. If a display device for displaying the power saving state is provided, it is not needed to turn on the lamps of the print key.

The power saving mode in this embodiment is a mode in which the power saving operation is automatically started if a set period of a timer, e.g. five minutes have passed after completion of temperature rise of the fixing device 28 of the copying apparatus A or after an end of copy operation. In the power saving operation, the temperature adjustment level of the fixing device 28 is lowered and the display device 72 of the operation panel 70 is turned off, thereby to reduce consumption of electric power when the copying apparatus A is not operated.

Figure 19:
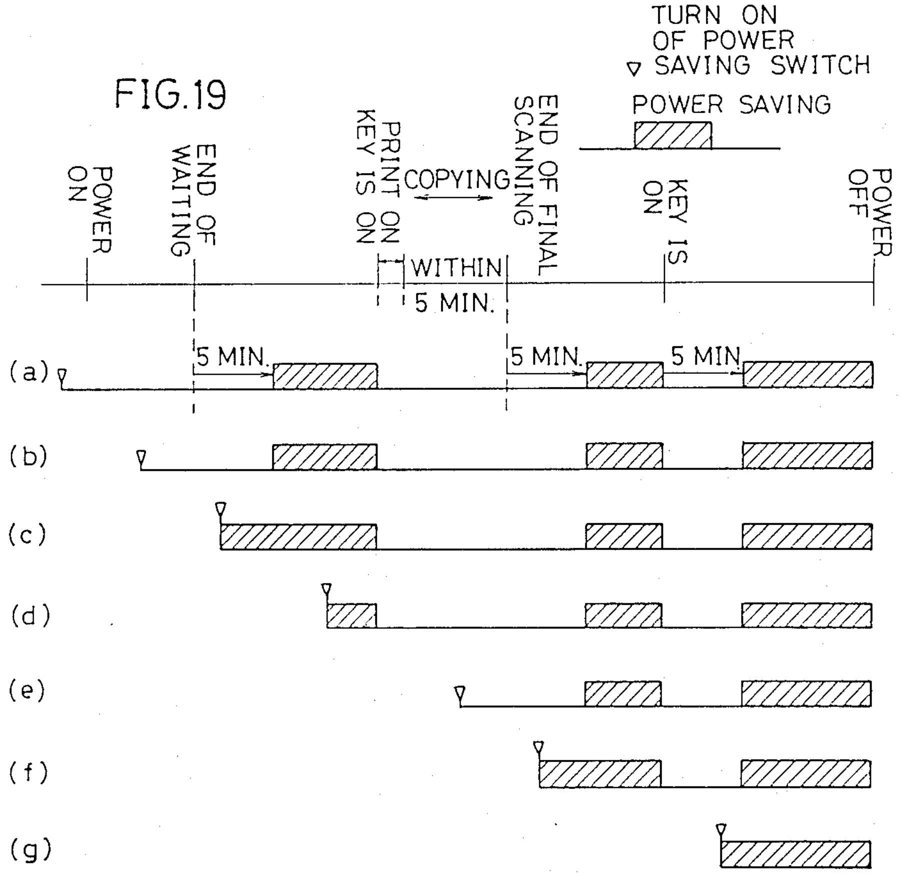
FIG. 19 is an illustration for explaining operation of a power saving mode.

The power saving mode includes different methods for starting the power saving operation dependent on the state of the copying apparatus A when the power saving switch 73 is turned on. As shown in FIG. 19, if the power saving switch 73 is already turned on before turn-on of the power supply, the power saving mode is automatically selected. Then, power saving operation is started after the lapse of a set period of the timer after completion of the temperature rise of the fixing device 28, i.e. an end of the waiting state, or completion of copying operation, i.e. the final scanning, or input through keys not enabling copy operation (as shown by (*a*) of FIG. 19). If the power saving switch 73 is turned on in the waiting state in which the temperature of the fixing device 28 is being raised, the power saving mode is also automatically selected (as shown by (*b*) of FIG. 19). If the power saving switch 73 is turned on before the lapse of the set period of the timer after completion of the temperature rise of the fixing device 28, the power saving mode is automatically selected to start a power saving operation (as shown by (*c*) of FIG. 19). If the power saving switch 73 is turned on after the lapse of the set period of the timer, the power saving mode is also automatically selected to start a power saving operation (as shown by (*d*) of FIG. 19). When the power saving switch 73 is turned on during a copy operation, the power saving mode is automatically selected (as shown by (*e*) of FIG. 19). If the power saving switch 73 is turned on before the lapse of the set period of the timer after an end of copy operation, the power saving mode is automatically selected to start a power saving operation (as shown by (*f*) of FIG. 19). If the power saving switch 73 is turned on before the lapse of the set period of the timer after input through keys on the operation panel 70, the power saving mode is automatically selected to start a power saving operation (as shown by (*g*) of FIG. 19).

In the above described embodiment, it is determined in the step S7 whether the apparatus A is in trouble or not, as can be seen from the flow chart in FIG. 4. If the apparatus A is in trouble, the automatic power-off subroutine in the step S16 is skipped and the power saving operation is cancelled in the step S19 so that the trouble display subroutine is executed in the step S20. As a result, if the apparatus A is in trouble, the power supply is not turned off by the automatic power-off function and the serviceman call display 74, the trouble code of the numerical display device 72 or the like is illuminated to indicate occurrence of trouble or measures to be taken. Accordingly, if the copying apparatus A is being used, the user immediately notices the occurrence of trouble and can take measures. Since a warning is given by the trouble display till the trouble is remedied, the user will not forget the trouble and will take measures without delay or a new user will notice the trouble to take suitable measures. If a trouble occurs when the copying apparatus A is not used, the trouble display is never caused to disappear by the turn-off of the power supply, which makes it possible to find the occurrence of the trouble without delay. As a result, measures can be immediately taken to remedy the trouble and such disadvantages as a considerable delay in copy operation or a considerable decrease in real operation time of the copying apparatus A can be dissolved.

Although, in the above described embodiment, the determination as to occurrence of trouble is effected by checking a state of the trouble flag FTRB, other methods may be adopted. In addition, a step for such determination may be provided otherwise in the flow chart, e.g. in a manner in which the automatic power-off subroutine is skipped when it is determined that the apparatus A is in trouble. Instead of skipping the automatic power-off function according to a program, interruption processing or the like may be performed dependent on the kind of trouble if trouble occurs, and a program for recovery from trouble may be forcedly executed so as not to perform the automatic power-off function, with a necessary trouble display being given. In this case, only a power supply necessary for executing the program for recovery from trouble and making the trouble display may be turned on and other power supply may be turned off. The trouble display may be given by illumination of a display lamp other than the serviceman call display 74 or the numerical display device 72, or by alarm sound such as an electronic sound. Various means may be used as the means for executing the automatic power-off function within the scope of the present invention.

Although the above described embodiment is related with the case in which the present invention is applied to a copying apparatus, the present invention is applicable to other office machines, industrial systems, household machines and the like.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. An automatic power turn-off apparatus for an image forming apparatus for forming an image on paper, comprising:

image forming means for forming an image on said paper;

detection means for detecting a trouble state of said image forming means;

display means for displaying the trouble state of said image forming means detected by said detection means and information to be used for the image formation;

clock means for providing an output signal on arrival of a specific time of day;

setting means for arbitrarily setting said specific time of day in said clock means;

power supply means for supplying electric power to said image forming means and said display means while said image forming means is in operation and in a waiting state;

power supply turn-off means responsive to the output signal provided from said clock means for turning off the electric power supply from said power supply means to said image forming means and to said display means, and control means for cancelling the turn-off of the electric power supply to said image forming means by said power supply turn-off means, upon detection of the trouble state by said detection means.

2. An automatic power turn-off apparatus for an image forming apparatus in accordance with claim 1, wherein said power supply turn-off means comprises means for turning off the electric power supply to said image forming means and to said display means after completion of operation of said image forming means if said image forming means is in operation when said clock means provides the output signal.

3. An automatic power turn-off apparatus for an image forming apparatus in accordance with claim 1, further comprising:

instruction means for issuing an instruction for forcibly cancelling the turn-off of the electric power supply to said image forming means and to said display means by said power supply turn-off means, and said control means comprising means responsive to the instruction from said instruction means for cancelling the turn-off of the electric power supply by said power supply turn-off means.

4. An automatic power turn-off apparatus for an image forming apparatus in accordance with claim 1, further comprising:

data setting means for setting data concerning image forming operation, and timer means for measuring a predetermined time after said data setting means sets the data;

means for clearing the data set heretofore if new data is not set by said data setting means in a period in which said timer means measures said predetermined time, and said power supply turn-off means comprising means for turning off the electric power supply to said image forming means and to said display means after completion of measurement of the timer means if said timer means is measuring the predetermined time when said clock means provides the output signal.

5. An automatic power turn-off apparatus for an image forming apparatus in accordance with claim 1, further comprising:

mode setting means for setting a power saving mode in which the electric power supply to said display means is turned off when said image forming means is in the waiting state, and said control means comprising means, upon detection of the trouble state of said image forming means, for causing said mode setting means to cancel the power saving mode so that the display means effectively displays the trouble state detected by said detection means.

6. If a copier having a plurality of power consuming components that operatively coact to form an image of an original, the improvement of an automatic power turn-off apparatus comprising:

copy means for copying an original set in an exposure position;

timer means for providing an output signal on arrival of a predetermined time;

power supply means for supplying electric power to said copy means;

power saving means for turning off certain predetermined power consuming components while maintaining power to other components requiring a long initialization period during power up of the copier to enable a power saving mode of operation during a copier waiting period;

means for activating a power saving mode of operation after a predetermined time period;

power supply turn-off means responsive to the output signal provided from said timer means for turning off the power supply from said power supply means to said copy means including means for turning off the power supply to said copy means after completion of operation of said copy means if said copy means is in operation when said timer means provides the output signal;

detection means for detecting a trouble state of said copy means;

instruction means for issuing an instruction for forcedly cancelling the turn-off of the power supply to said copy means by said power supply turn-off means;

data setting means for setting data concerning copy operation;

second timer means for measuring a predetermined time after said data setting means sets the data;

means for cancelling a power saving mode of operation in response to the detection of a trouble state;

notifying means for notifying the user of the trouble state detected by said detection means, and control means for cancelling the turn-off of the power supply to said copy means by said power supply turn-off means, upon detection of the trouble state by said detection means, including means responsive to the instruction from said instruction means for cancelling the turn-off of the power supply to said copy means by said power supply turn-off means and means for clearing the data set heretofore if new data is not set by said data setting means in a period in which said second timer means measures said predetermined time.

7. The copier of claim 6 further including a clock means for providing a time measurement up to 24 hours as a reference for the timer means.

* * * * *